(12) United States Patent
Martin et al.

(10) Patent No.: US 11,816,354 B2
(45) Date of Patent: Nov. 14, 2023

(54) PERSISTENT MEMORY ADAPTATION

(71) Applicant: EMC IP Holding Company LLC, Hopkinton, MA (US)

(72) Inventors: Owen Martin, Hopedale, MA (US); Dustin Zentz, Northborough, MA (US); Vladimir Desyatov, Hollis, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/939,146

(22) Filed: Jul. 27, 2020

(65) Prior Publication Data
US 2022/0027087 A1    Jan. 27, 2022

(51) Int. Cl.
*G06F 3/06* (2006.01)
*G06N 20/00* (2019.01)

(52) U.S. Cl.
CPC ............ *G06F 3/0659* (2013.01); *G06F 3/064* (2013.01); *G06F 3/0611* (2013.01); *G06F 3/0653* (2013.01); *G06F 3/0689* (2013.01); *G06N 20/00* (2019.01)

(58) Field of Classification Search
CPC ...... G06F 3/0659; G06F 3/0611; G06F 3/064; G06F 3/0653; G06F 3/0689; G06N 20/00
See application file for complete search history.

(56) References Cited

U.S. PATENT DOCUMENTS

| | | | | |
|---|---|---|---|---|
| 2005/0246487 A1* | 11/2005 | Ergan | .................. | G06F 12/0866 711/135 |
| 2012/0297122 A1* | 11/2012 | Gorobets | ................ | G06F 3/068 711/E12.008 |
| 2013/0227220 A1* | 8/2013 | Xi | ......................... | G06F 3/0607 711/133 |
| 2015/0032921 A1* | 1/2015 | Malkin | ................. | G06F 3/0685 710/74 |
| 2015/0169449 A1* | 6/2015 | Barrell | ................ | G06F 12/0806 711/143 |
| 2015/0347029 A1* | 12/2015 | Kotte | ..................... | G06F 3/0653 711/103 |
| 2016/0179678 A1* | 6/2016 | Camp | .................. | G06F 12/0884 711/103 |
| 2017/0075832 A1* | 3/2017 | Bhimani | ................ | G06F 3/0688 |
| 2018/0181303 A1* | 6/2018 | Hall | ........................ | G06F 3/061 |

* cited by examiner

*Primary Examiner* — Kalpit Parikh
(74) *Attorney, Agent, or Firm* — Krishnendu Gupta; Nikhil Patel (57) ABSTRACT

Embodiments of the present disclosure relate to establishing persistent cache memory as a write tier. An input/output (IO) workload of a storage array can be analyzed. One or more write data portions of the IO workload can be stored in a persistent memory region of one or more disks of the storage array.

20 Claims, 4 Drawing Sheets

```
┌─────────────────────────┐
│ Analyzing an IO workload of a │
│      storage array       │
│                         │
│          405            │
└─────────────────────────┘
            │
            ▼
┌─────────────────────────┐
│ Storing a write data portion of the │
│ IO workload in a persistent cache │
│       memory of a disk       │
│                         │
│          410            │
└─────────────────────────┘
```

FIG. 4

PERSISTENT MEMORY ADAPTATION

BACKGROUND

Storage device engines are devices that control storage systems. Such controllers can comprise a CPU (central processing unit), a cache memory, and a connection interface with network and memory devices. In general, the role of storage device engines is to perform processing tasks in an efficient and stable manner. For example, controllers can manage requests for memory for storage systems. Specifically, storage device engines can manage memory access requests of each device of a storage system by directing the requests to memory assigned to each device.

SUMMARY

Embodiments of the present disclosure relate to establishing persistent cache memory as a write tier. An input/output (IO) workload of a storage array can be analyzed. One or more write data portions of the IO workload can be stored in a persistent memory region of one or more disks of the storage array.

In embodiments, the persistent memory region of the one or more disks can be provisioned to store the one or more write data portions.

In embodiments, the persistent memory region can include non-volatile storage.

In embodiments, the persistent memory region can be configured with a similar RAID striping as block storage devices of the storage array.

In embodiments, write operations included in the IO workloads can be identified.

In embodiments, identifying the write operations can include configuring an IO operation filter to identify write operations within the IO workload based on metadata associated with each IO operation in the IO workload.

In embodiments, write densities of address spaces corresponding to the write operations can be identified.

In embodiments, one or more machine learning techniques can be performed to anticipate write densities of the address spaces, wherein the one or more machine learning techniques includes an instance-based learning processor.

In embodiments, a data structure identifying address spaces organized by an activity ranking metric that identifies write activity levels of each address space can be generated. Further, one or more traffic policies configured to store those IO write operations and their corresponding data having a ranking metric above a threshold rank to the persistent memory region can be generated.

In embodiments, IO write operations can be directed to the persistent memory region using the one or more traffic policies

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Data has become a key input for driving growth, enabling businesses to differentiate themselves and support a competitive edge. For instance, businesses can harness data to make decisions about finding new customers, increasing customer retention, improving customer service, making better marketing decisions, and predicting sales trends, amongst others. Businesses both generate and collect vast amounts of data and often store the data in a storage array.

A storage array is a storage system that allows an organization to ensure timely delivery of data to end users (e.g., employees), applications, and other information technology (IT) systems over a communications network (e.g., a storage area network (SAN)). A storage array can use a disk storage protocol to deliver block access storage services. For example, block access storage services enable organizations to manage access to critical information stored by one or more disk drives of the storage array. The protocols can include storage array can include multiple disk drives to store, e.g., data and applications. Example protocols can include Fibre Channel, Small Computer Systems Interface (iSCSI), Serial Attached SCSI (SAS), and Fibre Connection (FICON), amongst others, which were originally designed for hard disk drive (HDD) systems.

Because HDDs rely on spinning disks, motors, and read/write heads, using magnetism to store data on a rotating platter, they are prone to breaking down. As such, organizations are increasingly requesting vendors to supply storage arrays with flash-based solid-state drives (SSDs), which do not include moving parts. Example flash SSDs include NAND SSDs that can comprise memory cells having control and floating gates that help control data flow. A NAND SSD programs data to be stored in one of its memory cells by issuing a voltage charge to the cell's control gate. Although a NAND SSD is more robust then an HDD, NAND SSDs can degrade from overuse.

Embodiments of the present disclosure include adapters (e.g., disk adapters) that can extend the endurance and increase the performance of a NAND SSD. For example, the adapters disclosed herein can allocate a NAND's persistent memory region (PMR) (e.g., persistent cache memory) as a write cache tier to avoid write amplification of high write address spaces of NAND memory cell regions. By offloading the NAND cell memory address spaces with high write skews to the NAND's persistent cache memory, the embodiments disclosed herein are able to extend the endurance of the high write skewed NAND cell memory address space regions and increase performance of reads from and writes to the NAND SSD.

Figure 1:
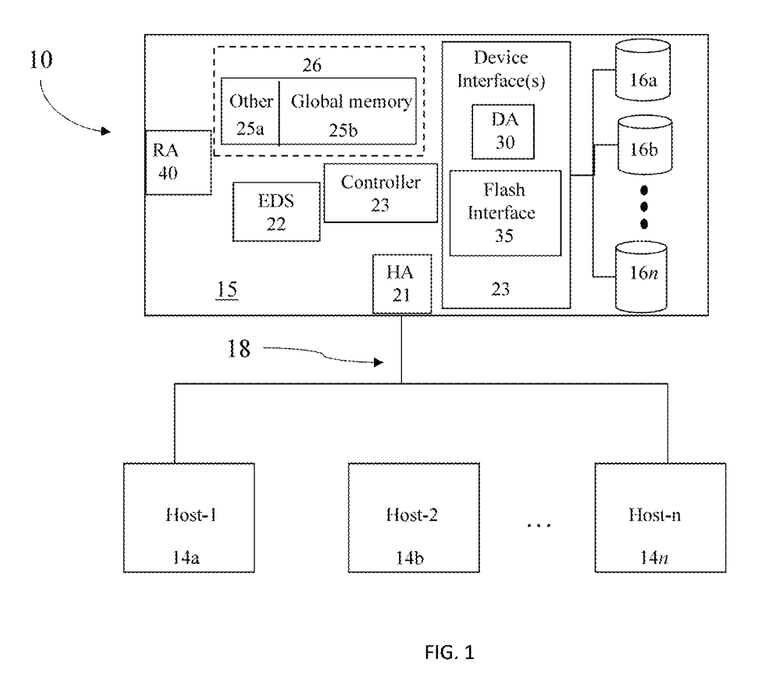
FIG. 1 is a block diagram of a storage system in accordance with example embodiments disclosed herein.

Referring to FIG. 1, an example system IO includes data storage device 15. The device 15 can communicatively couple to host systems 14*a-n* through communication medium 18. In embodiments, the hosts 14*a-n* can access the data storage device 15, for example, to perform input/output (IO) operations or data requests. The communication medium 18 can be any one or more of a variety of networks or other type of communication connections as known to those skilled in the art. In embodiments, the communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the hosts 14*a-n* can access and communicate with the data storage device 15. The hosts 14*a-n* can also communicate with other components included in the system IO via the communication medium 18.

The hosts 14*a-n* and the data storage device 15 can be connected to the communication medium 18 by any one of a variety of connections as can be provided and supported in accordance with the type of communication medium 18. The processors included in the hosts 14*a-n* can be any one of a variety of proprietary or commercially available single or multi-processor system, such as an Intel-based processor, or other type of commercially available processor able to support traffic in accordance with each embodiment and application.

It should be noted that the examples of the hardware and software that can be included in the data storage device 15 are described herein in more detail and can vary with each embodiment. Each of the hosts 14*a-n* and the data storage device 15 can all be located at the same physical site or can be in different physical locations. Examples of the communication medium 18 that can be used to provide the different types of connections between the host computer systems and the data storage system of the system IO can use a variety of different communication protocols such as SCSI, Fibre Channel, iSCSI, and the like. Some or all the connections by which the hosts 14*a-n* and the data storage device 15 can be connected to the communication medium can pass through other communication devices, such switching equipment that can exist such as a phone line, a repeater, a multiplexer or even a satellite.

Each of the hosts 14*a-n* can perform different types of data operations in accordance with different types of tasks. In embodiments, any one of the hosts 14*a-n* can issue a data request to the data storage device 15 to perform a data operation. For example, an application executing on one of the hosts 14*a-n* can perform a read or write operation resulting in one or more data requests to the data storage device 15.

It should be noted that although element 15 is illustrated as a single data storage device, such as a single data storage array, element 15 can also represent, for example, multiple data storage arrays alone, or in combination with, other data storage systems, systems, appliances, and/or components having suitable connectivity, such as in a SAN. It should also be noted that an embodiment can include data storage arrays or other components from one or more vendors. In subsequent examples illustrated the embodiments herein, reference can be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage device 15 can be a data storage array including a plurality of data storage disks 16*a-n*. The data storage disks 16*a-n* can include one or more data storage types such as, for example, one or more disk drives and/or one or more solid state drives (SSDs). An SSD is a data storage device that uses solid-state memory to store persistent data. An SSD using SRAM or DRAM, rather than flash memory, can also be referred to as a RAM drive. SSD can refer to solid state electronics devices as distinguished from electromechanical devices, such as hard drives, having moving parts. Flash devices or flash memory based SSDs are types of SSD that do not include moving parts. In embodiments, one or more of the disks 16*a-n* can be flash drives or devices. In other embodiments, the disks 16*a-n* can be any type of SSD, flash device, or flash memory device.

The storage device 15 can also adapters or directors, such as an HA 21 (host adapter), RA 40 (remote adapter), and/or device interface 23. Each of the adapters HA 21, RA 40 can be implemented using hardware including a processor with local memory with code stored thereon for execution in connection with performing different operations. The HA 21 can be used to manage communications and data operations between one or more host systems 14*a-n* and a global memory (GM) 25*b*. In an embodiment, the HA 21 can be a Fibre Channel Adapter (FA) or another adapter which facilitates host communication. The HA 21 can be characterized as a front-end component of the data storage device 15 which receives a request from one or more of the hosts 14*a-n*. The storage device 15 can also include one or more RAs (e.g., RA 40) that can be used, for example, to facilitate communications between data storage arrays (e.g., between the storage array 12 and the external storage system(s)). The storage device 15 can also include one or more device interfaces 23 for facilitating data transfers to/from the data storage disks 16*a-n*. The data storage interfaces 23 can include device interface modules, for example, one or more disk adapters (DAs) 30 (e.g., disk controllers), flash drive interface 35, and the like. The DA 30 can be characterized as a backend component of the data storage device 15 which interfaces with the physical data storage disks 16*a-n*.

In embodiments, the storage device 15 can include one or more internal logical communication paths (not shown) between the device interfaces 23, the RAs 40, the HAs 21, and the memory 26. The communication paths can include internal busses and/or communication modules. For example, the global memory 25*b* can use the communication paths to transfer data and/or send other communications between the device interfaces 23, HAs 21 and/or RAs 40 in a data storage array. In an embodiment, the device interfaces 23 can perform data operations using a cache that can be included in the global memory 25*b*, for example, when communicating with other device interfaces and other components of the data storage array. The other portion 25*a* is that portion of memory that can be used in connection with other designations that can vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, can also be included in an embodiment.

Host systems 14*a-n* provide data and access control information through channels to the storage device 15. and the storage device 15 can also provide data to the host systems 14*a-n* also through the channels. The storage device 15 prevents the host systems 14*a-n* from addressing the drives or disks 16*a-n* directly, but rather provides the host systems 14*a-n* with logical devices or logical volumes (LVs). The LVs do not need to correspond to the actual physical devices or drives 16*a-n*. For example, one or more LVs can reside on a single physical drive or multiple drives. Data in a single data storage system, such as a single storage device 15, can be accessed by multiple hosts allowing the hosts to share the data residing therein. The HA 21 can be used in connection with communications between a storage device 15 and one or more of the host systems 14a-n. The RA 40 can be configured to facilitate communications between two or more data storage arrays (e.g., device 12 and external device(s) 15). The DA 30 can be one type of device interface used in connection with facilitating data transfers to/from the associated disk drive(s) 16a-n and LV(s) residing thereon. A flash device interface 35 can be configured as a device interface for facilitating data transfers to/from flash devices and LV(s) residing thereon. It should be noted that an embodiment can use the same or a different device interface for one or more different types of devices than as described herein.

The device interface, such as a DA 30, performs IO operations on a drive 16a-n. In the following description, data residing on an LV can be accessed by the device interface following a data request in connection with IO operations that other directors originate. Data can be accessed by LV in which a single device interface manages data requests in connection with the different one or more LVs that can reside on a drive 16a-n. For example, a device interface can be a DA 30 that accomplishes the foregoing by creating job records for the different LVs associated with a device. These different job records can be associated with the different LVs in a data structure stored and managed by each device interface.

In embodiments, the DA 30 can establish a write tier from a persistent cache memory region of one or more of the disks 16a-n. In embodiments, the DA 30 can analyze IO workloads of the storage array 15. Based on the analysis, the DA 30 can store the write data portions in the established write tier as described in greater detail in the following paragraphs.

Figure 2:
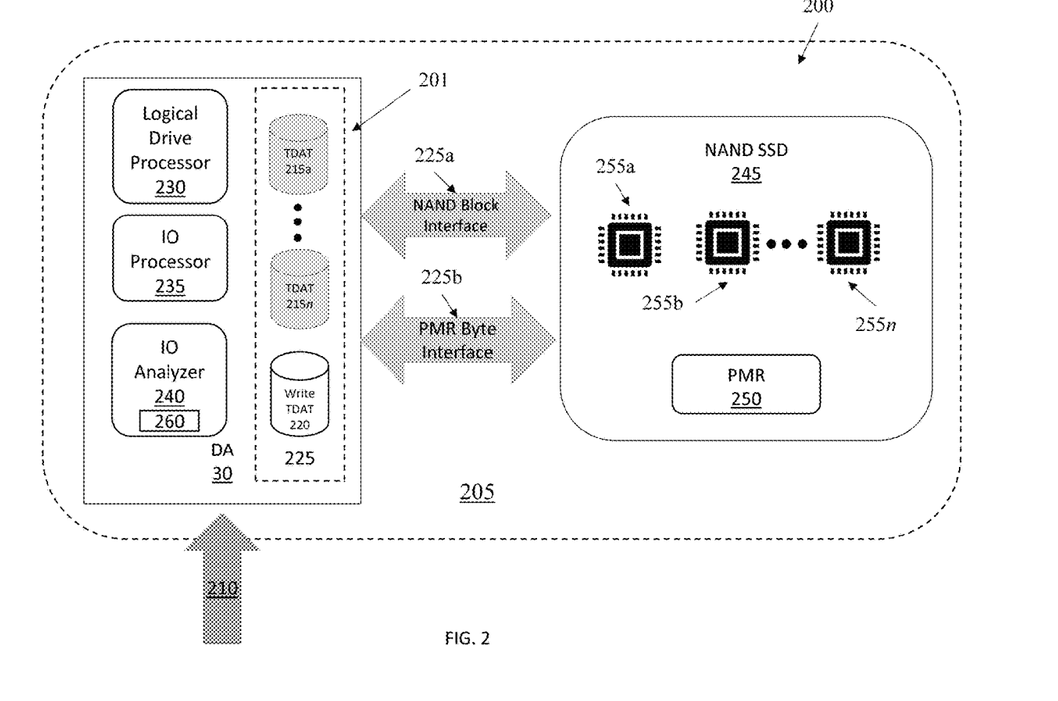
FIG. 2 is a block diagram of backend portion of a storage array in accordance with example embodiments disclosed herein.

Referring to FIG. 2, a backend portion 205 of the storage array 15 can include elements 200 (e.g., software and hardware elements) that process IO workloads (e.g., IO streams) 210. In embodiments, the elements 200 can include a DA 30 and a NAND SSD 245, amongst other known storage device components (not shown). The DA 30 can include DA elements 201 that can receive and process IO streams including one or more IO operations requesting access to a NAND SSD 245, which can be included with one or more of the disks 16a-n of FIG. 1. The NAND SSD 245 can include memory cells 255a-n configured for persistent storage of data. The NAND SS 245 can also include a PMR 250 configured as persistent cache memory for transferring between the HA 21 and the NAND SSD 245 in response to read or write IO operations included in an IO stream.

In embodiments, the DA 30 can include a logical drive (LD) processor 230. The LD processor 230 can establish virtualized storage (VS) 225 (e.g., logical volumes (LVs)) that include logical drives, e.g., TDATs 215a-n. The LD processor generate the TDATs 215a-n to provide hosts 14a-n virtual representations of one or more address spaces (e.g., memory regions) of the memory cells 255a-n. Accordingly, hosts 14a-n can include information with IO operations that identify one or more of the TDATs 215a-n. Based on the identified TDAT(s) 215a-n, the DA 30 can using, e.g., IO processor 235 direct the write or read requests to corresponding address spaces of the memory cells 255a-n. The DA 30 can direct data requests directed to one or more of the TDATs 215a-n to their corresponding physical address spaces of memory cells 255a-n via, e.g., a NAND block interface 225a. For example, each of the TDATs 215a-n that hosts 14a-n directs an IO operation can be logically linked to corresponding physical address spaces of the memory cells 255a-n. For example, the block interface 225a provides a data transfer channel between the DA 30 and the memory cells 255a-n of the NAND SSD 245 that enables the DA 30 to store or request data from the memory cells 255a-n using logical links included in each of the TDATs 215a-n. The logical links can be a data structure such as reference pointers and any other known location identification technique that identifies physical memory locations.

In embodiments, the LD processor 230 can allocate one or more portions of the PMR 250 to be used as a write tier cache storage that can store incoming IO operations. Further, the LD processor 230 can establish virtualized storage, e.g., write TDAT 220 that corresponds to the allocated portions of the PMR 250. In embodiments, the LD processor 230 can allocate the portions of PMR 250 and establish their corresponding write TDATs 220 based on one or more virtual storage (VS) models generated by an IO analyzer 240 of the DA 30. For example, one or more of the VS models can identify memory regions (e.g., address spaces) of the memory cells 255a-n that receive highly skewed amount of write data requests. Based on the identified memory regions, the LD processor 230 can generate a write TDAT(s) 220 and associate them with one or more of the allocated portions of the PMR 250. Further, the LD processor can associate TDAT(s) 215a-n logically linked to the highly skewed write address spaces of the memory cells 255a-n to the TDAT(s) 220. Thus, the DA 30 can direct write data request directed to the memory cell address spaces receiving highly skewed amounts of write request to the TDAT 220. By directing data to be stored to the one or more portions of the PMR 250, the DA 30 can extend an endurance of the NAND SSD 245. Further, the LD processor 230 can establish a searchable data structure that associates TDATs 215a-n corresponding to address spaces of memory cells 255a-n having highly skewed amount of write data requests to write tier TDAT 220.

In embodiments, the DA can include an IO analyzer 260 that monitors IO workloads (e.g., IO streams and data traffic) received by the HA 21. Further, the IO analyzer 260 can monitor IO workloads to determine a percentage of IO operations in each workload that request access to disks 16a-n, which can include NAND SSDs such as the NAND SSD 245. Based on the analysis, the IO analyzer 260 can generate predictions of time windows it anticipates the storage device 12 to receive IO workloads and each workload's composition of IO operations. Based on the predictions, the analyzer 260 can generate one or more PMR models.

In embodiments, the analyzer 240 can include a machine learning (ML) engine 260 that can analyze IO streams to generate the one or more PMR models. By analyzing the IO streams, the ML engine 260 can anticipate IO workloads that the storage device 12 can expect to receive during one or more time-windows (e.g., current and/or future). The analyzer 240 can analyze the IO streams and define received workloads based on IO types, IO sizes, track sizes, and SLs associated with each IO, activity types, amongst other parameters and patterns of each parameter (e.g., frequency). Using the analyzed data, the ML engine 260 can use an ML technique such as instance-based learning to identify and predict write densities of address spaces of the memory cells 255a-n. The ML engine 260 can further generate one or more PMR models that define those address spaces having write densities over a threshold density (e.g., writes per unit of time).

Using at least one of the PMR models, the LD processor 230 can establish PMR write tiers from PMR 250 and establish corresponding virtual write TDAT drives 220 for those address spaces having write densities above the threshold density. Further, the DA 30 can include an IO processor 235 that can use the models and metadata within each IO operation to direct traffic to virtual storage 225 that includes virtualize NAND block storage 215a-n and virtualized PMR storage 220. Each PMR model include a searchable data structure that maps address spaces to their corresponding density levels and further flag those address spaces having densities above the threshold.

In response to receiving an IO operation from hosts 14a-n, the DA 30 can include an IO processor 235 that can direct data requests to TDATs 215a-n or TDAT 220 based on one or more of the PMR models and their corresponding searchable data structures.

The following text includes details of one or more methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter.

Figure 3:
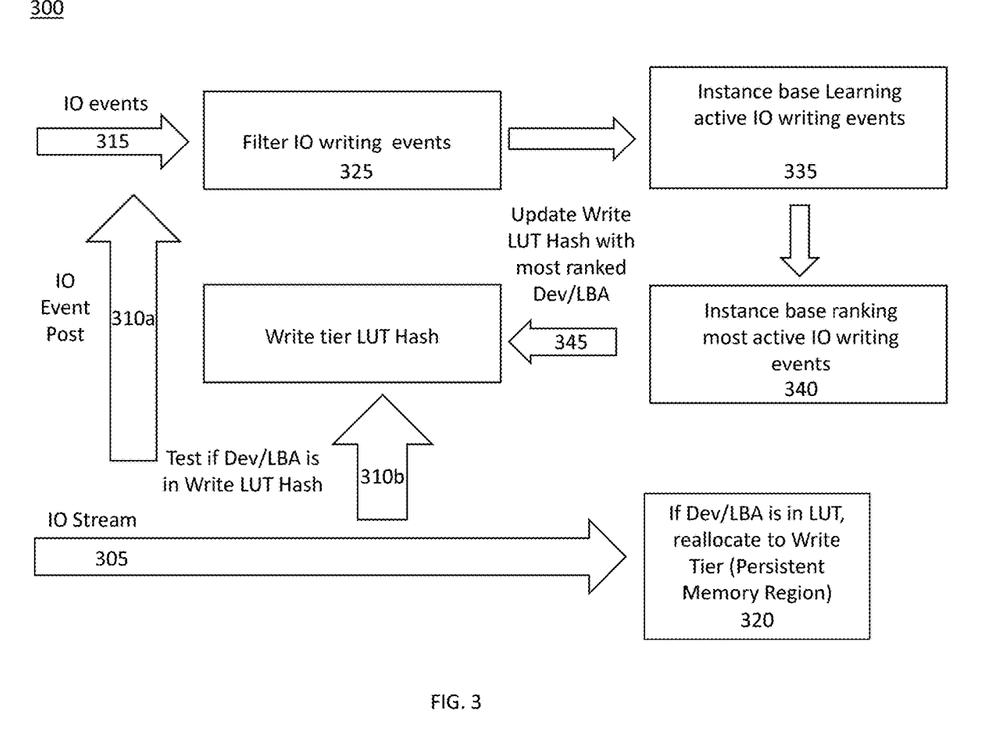
FIG. 3 is a flow diagram of a method for processing IO workloads in accordance with example embodiments disclosed herein.

Referring to FIG. 3, a method 300 can be executed by, e.g., a disk adapter, e.g., the DA 30 and/or any of its elements 201 of FIG. as illustrated in FIG. 2. The method 300, at 305 can include, at 305, receiving an IO stream. At 310a, the method 300 can include posting IO events included in the IO stream to, e.g., DA 30.

The method 300, at 310b, can also include searching a searchable data structure, e.g., a lookup table (LUT) hash to determine if a device (e.g., one of the memory cells 255a-n or address space of one of the memory cells 255a-n is included in a LUT that defines devices and address spaces with write densities above a threshold density. If the search of the LUT hash results in a hit (e.g., match), the method 300, at 320, can including directing the data request corresponding to the 10 event to, e.g., a memory portion of PMR 250 via write TDAT 220 and PMR byte interface 225b. If the search does not result in a hit, the method 300 can include directing the IO event to an address space of one or more of the memory cells 225a-n via the corresponding TDAT(s) 215a-n.

Further, the method 300, at 325, can include identifying and filtering out IO events corresponding to write data requests. At 335, the method 300, at 335 can further include ingesting the write events by, e.g., the ML engine 260 that processes the write events using an instance-based learning technique to identify active write event address spaces of the memory cells 255a-n. Further, the method 300, at 340, can include performing by, e.g., the ML engine 260, an instance-based ML ranking technique to identify the most write event active address spaces of the memory cells 255a-n. Based on the identified most write event active address spaces, the ML engine 260 can generate a threshold density (e.g., KB per unit of time). Using the threshold density, the method 300, at 345, can generate and/or update a write tier LUT hash with those address spaces having write densities above the threshold density.

Figure 4:
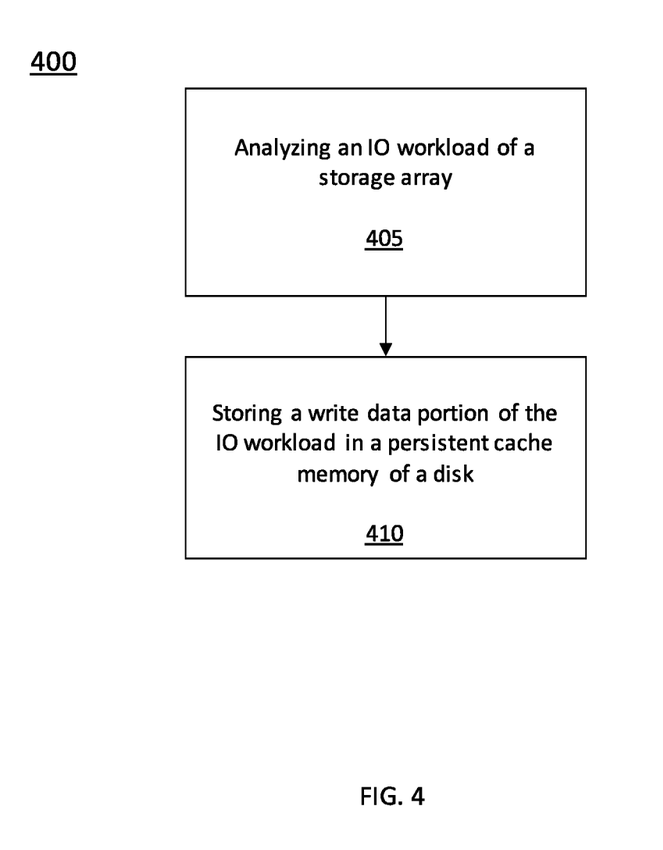
FIG. 4 is a flow diagram of a method for storing write data portions of IO workloads in accordance with example embodiments disclosed herein.

Referring to FIG. 4, a method 400 can be executed by, e.g., a disk adapter (e.g., the adapter 30 of FIG. 1) and/or any element of device 15 of FIG. 1. The method 400 describes steps for storing write data portions of IO workloads on a persistent cache memory of one or more storage disks (e.g., disks 16a-n of FIG. 1) of the device. At 405, the method 400 can include analyzing an input/output (IO) workload of a storage array. The method 400, at 410, can also include storing one or more write data portions of the IO workload in a persistent cache memory region of one or more disks of the storage array. It should be noted that each step of the method 400 can include any combination of techniques implemented by the embodiments described herein.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

The above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described embodiments can be implemented in a distributed computing system that includes a backend component. The backend component can, for example, be a data server, a middleware component, and/or an application server. The above described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   analyze an input/output (IO) workload of a storage array;
   in a backend portion of the storage array:
      establish at least one logical drive corresponding to one or more address spaces within a persistent data storage device of the storage array, wherein the address spaces correspond to a physical location within the persistent data storage device;
      identify each address space with a write request density above a threshold;
      allocate a persistent memory region (PMR) of persistent cache memory within the persistent data storage device to cache write data requests targeting the address spaces with the write request densities above the threshold;
      establish a virtualized memory storage corresponding to a persistent memory region (PMR) of persistent cache memory within the persistent data storage device; and
      direct IO write requests to the at least one logical drive or the virtualized memory storage based on the identified address spaces with write request densities above the threshold.

2. The apparatus of claim 1 further configured to provision the persistent memory region of the one or more disks to store the one or more write data portions.

3. The apparatus of claim 2, wherein the persistent memory region includes non-volatile storage.

4. The apparatus of claim 2, wherein the persistent memory region is configured with a similar RAID striping as block storage devices of the storage array.

5. The apparatus of claim 1 further configured to identify write operations included in the IO workloads.

6. The apparatus of claim 5, wherein identifying the write operations includes configuring an IO operation filter to identify write operations within the IO workload based on metadata associated with each IO operation in the IO workload.

7. The apparatus of claim 5 further configured to identify write densities of address spaces corresponding to the write operations.

8. The apparatus of claim 7 further configured to perform one or more machine learning techniques to anticipate write densities of the address spaces, wherein the one or more machine learning techniques includes an instance-based learning processor.

9. The apparatus of claim 8 further configured to:
   generate a data structure identifying address spaces organized by an activity ranking metric that identifies write activity levels of each address space; and
   generate one or more traffic policies configured to store those IO write operations and their corresponding data having a ranking metric above a threshold rank to the persistent memory region.

10. The apparatus of claim 9 further configured to direct IO write operations to the persistent memory region using the one or more traffic policies.

11. A method comprising:
   analyzing an input/output (IO) workload of a storage array;
   in a backend portion of the storage array:

establishing at least one logical drive corresponding to one or more address spaces within a persistent data storage device of the storage array, wherein the address spaces correspond to a physical location within the persistent data storage device;

identifying each address space with a write request density above a threshold;

allocating a persistent memory region (PMR) of persistent cache memory within the persistent data storage device to cache write data requests targeting the address spaces with the write request densities above the threshold;

establishing a virtualized memory storage corresponding to a persistent memory region (PMR) of persistent cache memory within the persistent data storage device; and directing IO write requests to the at least one logical drive or the virtualized memory storage based on the identified address spaces with write request densities above the threshold.

12. The method of claim 1 further comprising provisioning the persistent memory region of the one or more disks to store the one or more write data portions.

13. The method of claim 2, wherein the persistent memory region includes non-volatile storage.

14. The method of claim 2, wherein the persistent memory region is configured with a similar RAID striping as block storage devices of the storage array.

15. The method of claim 1 further comprising identifying write operations included in the IO workloads.

16. The method of claim 5, wherein identifying the write operations includes configuring an IO operation filter to identify write operations within the IO workload based on metadata associated with each IO operation in the IO workload.

17. The method of claim 5 further comprising identifying write densities of address spaces corresponding to the write operations.

18. The method of claim 7 further comprising performing one or more machine learning techniques to anticipate write densities of the address spaces, wherein the one or more machine learning techniques includes an instance-based learning processor.

19. The method of claim 8 further comprising:

generating a data structure identifying address spaces organized by an activity ranking metric that identifies write activity levels of each address space; and generating one or more traffic policies comprising store those IO write operations and their corresponding data having a ranking metric above a threshold rank to the persistent memory region.

20. The method of claim 9 further comprising directing IO write operations to the persistent memory region using the one or more traffic policies.

* * * * *